Figure 1B:
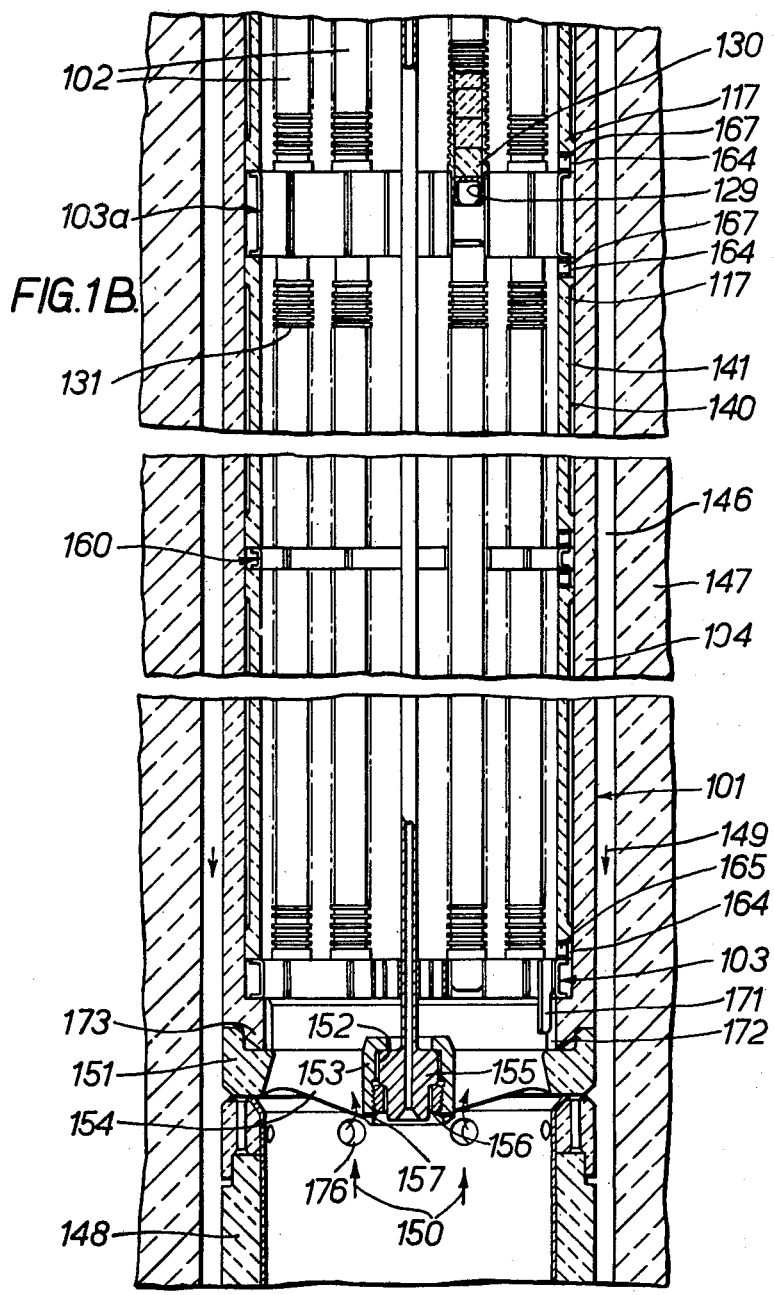

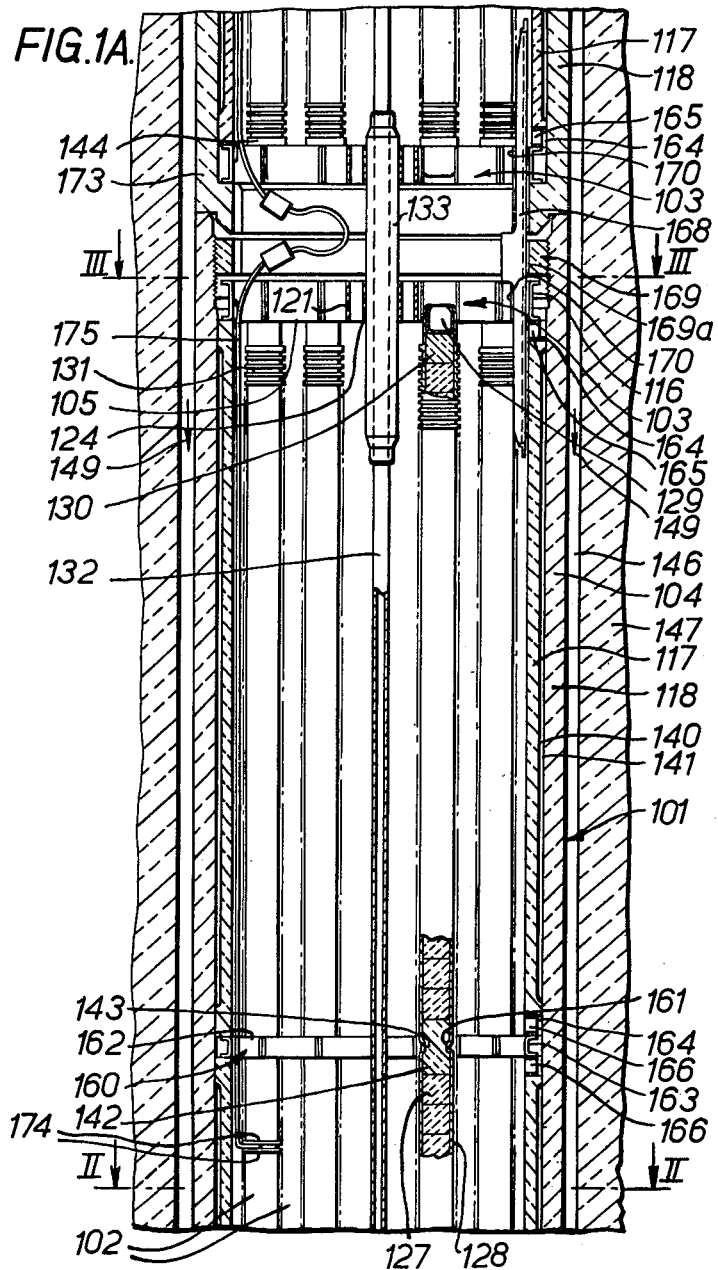

United States Patent Office 3,164,529
Patented Jan. 5, 1965

3,164,529
FUEL ELEMENTS FOR NUCLEAR REACTORS
Peter Waine, Padgate, Warrington, and James Duncan Waters, Lymm, England, assignors to United Kingdom Atomic Energy Authority, London, England
Filed Apr. 16, 1962, Ser. No. 187,884
Claims priority, application Great Britain May 24, 1961
3 Claims. (Cl. 176—78)

This invention relates to fuel elements for nuclear reactors and it is concerned with that type of fuel element known as a "cluster fuel element."

A cluster fuel element comprises a lattice or lattices of elongated fuel members (for example, fuel rods), spaced apart at their ends by support grid structures disposed in a carrier member of tubular form. The grid structures are traversed by the coolant medium passing through the carrier member to cool the fuel members and it is customary to make the grid structures of thin (e.g. .010" to .020") section webs disposed edge-on to coolant flow so as not to impede the coolant flow unduly.

It has now been discovered that movements of the fuel members with temperature changes can cause the grid support structures to deform plastically even though the members are, by design, a sliding fit in the grids. Whilst the reasons for this deformation are not clearly appreciated at present, it is considered that either by dishing of the grid or by bowing of the fuel members the co-axial fit of a fuel member in a grid structure becomes disturbed so that the fuel member becomes misaligned with the grid structure and the former no longer slides. Further movement of the fuel member then causes corresponding movement of the grid structure until plastic deformation takes place (which is also probably accompanied by stressing of the fuel members, itself an undesirable feature as the fuel members would have to be designed to accept such stresses even at the expense of their nuclear characteristics).

Dishing stresses can be resisted in a number of ways. In one arrangement, the stresses are resisted by substantial increase of the depth of a grid support structure, but, because of the obvious need to limit the amount of neutron-absorbing material within the core of a nuclear reactor, this arrangement is practicable only where a further advantage may be gained; for example, where the support structure is required to locate the opposed ends of a pair of adjacent lattices of fuel members.

In another arrangement, the overall thickness of the material of the support structure is increased. To make the structure inherently resistant to dishing stresses however, the material thickness must be increased substantially and this is prohibitive not only because of the increase in neutron absorbing material but also because of a substantial increase of coolant pressure drop across the structure.

According to the present invention, a cluster fuel element wherein the individual fuel members of the element are spaced apart at their ends by grid support structures, is characterised in that at least one of the support structures comprises a relatively large number of relatively thin webs shaped to provide end-location of the fuel members and not inherently capable of resisting dishing stresses, together with a relatively small number of relatively thick webs providing reinforcement against dishing stresses of said relatively thin webs.

The invention provides a support structure inherently capable of resisting dishing stresses with only a small increase in neutron-absorbing material and pressure drop.

Figure 2:
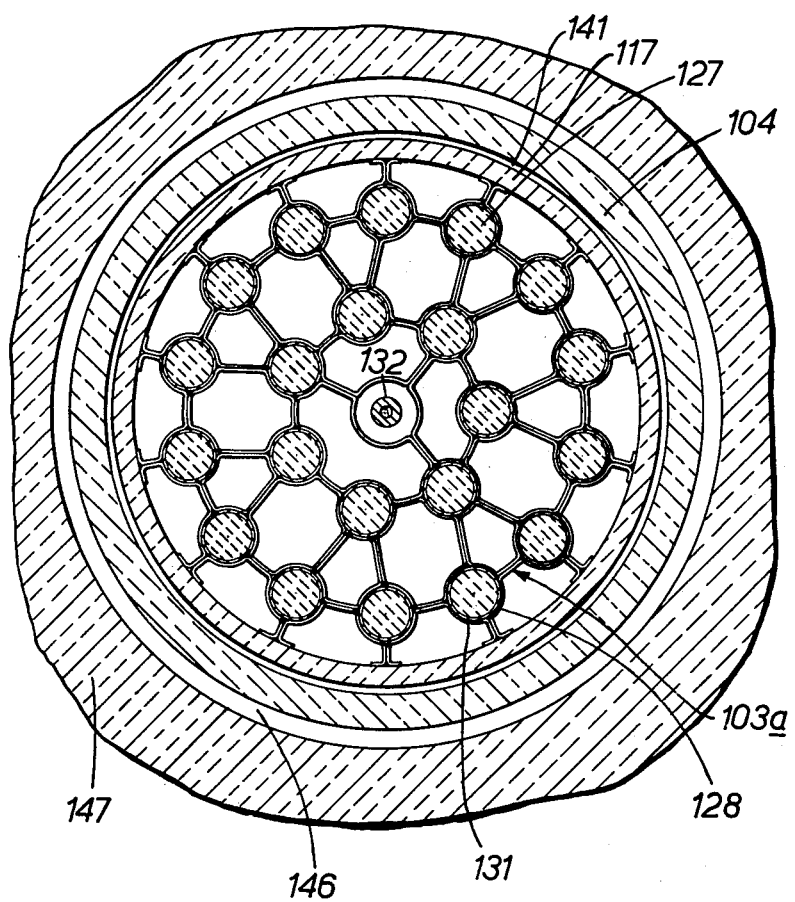
Figure 3:
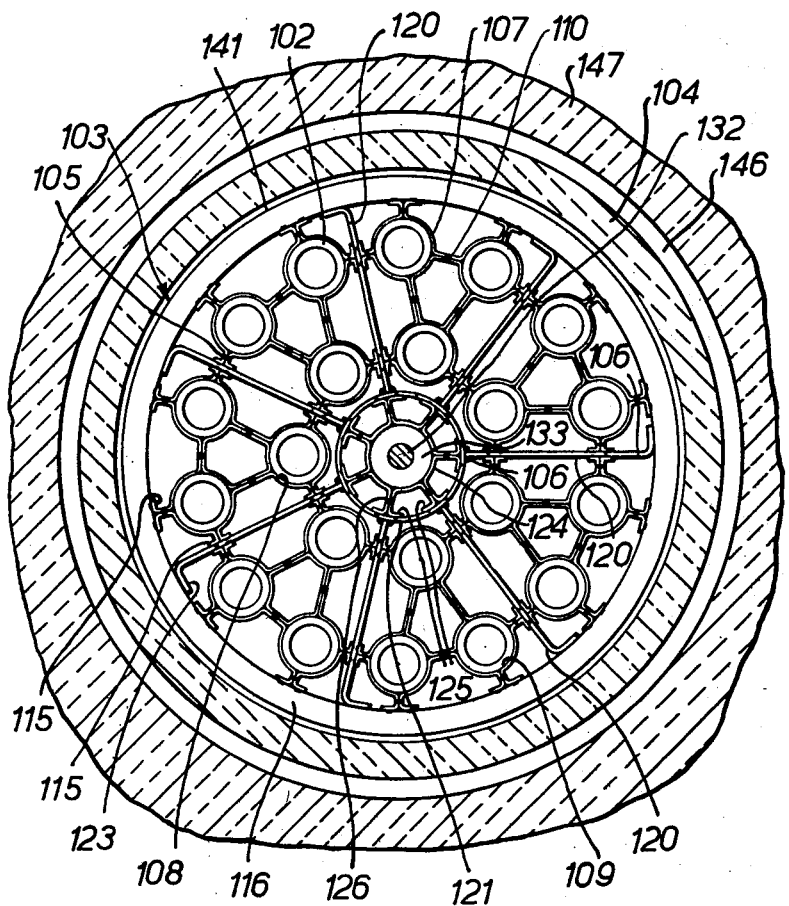
Figure 4:
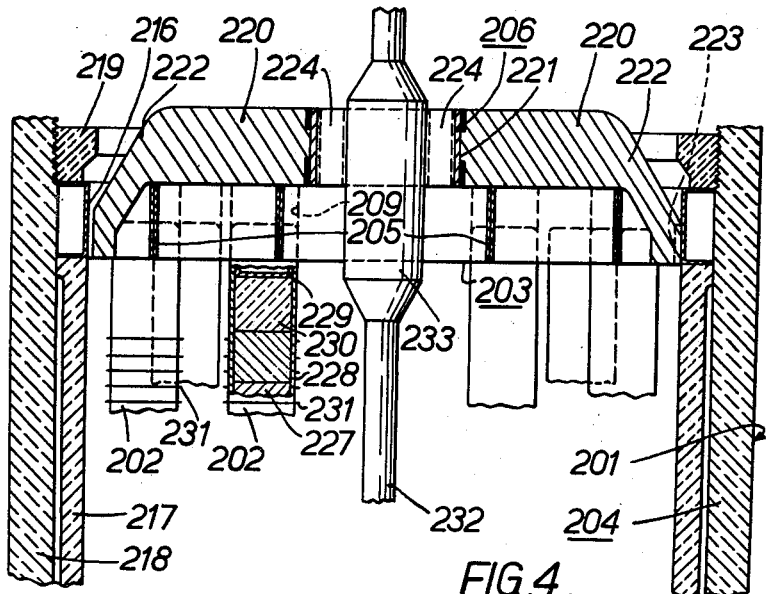
Figure 5:
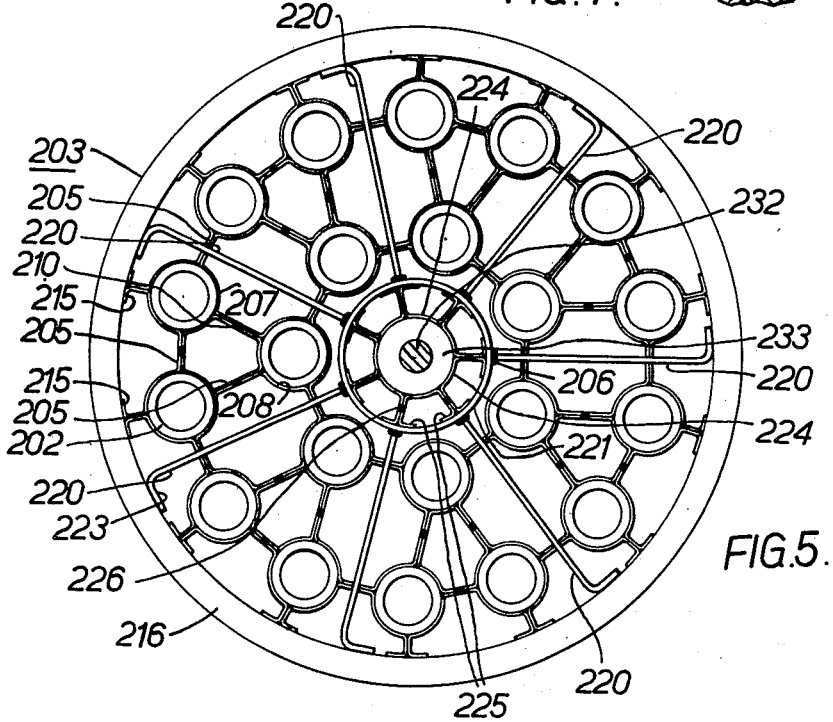
Figure 6:
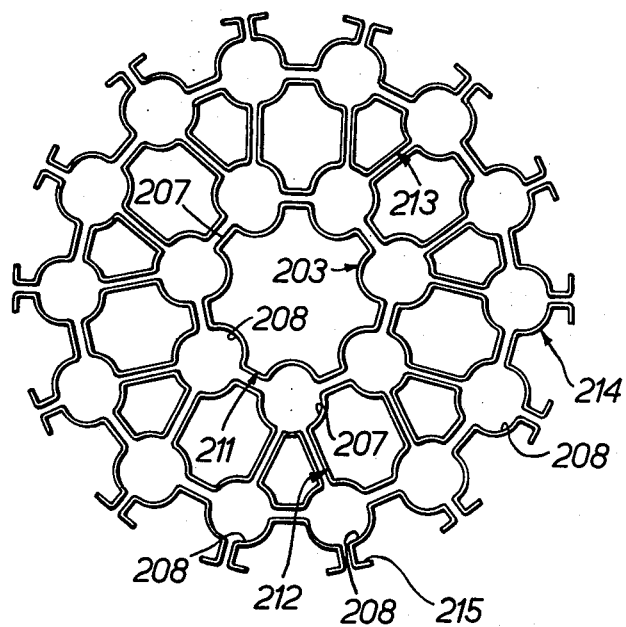

Two embodiments of the invention will now be described with reference to the accompanying drawings wherein:

FIGURES 1A and 1B combine to provide a fragmentary side view in medial section of one embodiment, FIGURE 2 is a section on the lines II—II of FIGURE 1A, FIGURE 3 is a section on the lines III—III of FIGURE 1A, FIGURE 4 is a fragmentary side view in medial section of the other embodiment, FIGURE 5 is a plan view of the grid structure shown in FIG. 4, and FIGURE 6 is a detail in "exploded" form.

FIGURES 1A, 1B, 2 and 3 show a cluster fuel element 101 having end-stacked lattices each comprising twenty-one spaced fuel rods 102 end-supported in grid support structures 103, 103a located in a carrier member 104 of tubular form. The structures 103 have a relatively large number of relatively thin (.020") webs 105 not inherently capable of resisting dishing stresses, interspaced and attached to a relatively small number of relatively thick (.040") webs 120 reinforcing the webs 103 against dishing stresses.

Strips 107 (.010" thick) having transverse troughs 108 of arcuate form at intervals and assembled with the lengths of the strips 107 intermediate the troughs 108 juxtaposed in pairs form 63 webs 105, with the troughs 108 coming together to define a number of spaced openings 109 in which the ends of the fuel rods 102 are located as a sliding fit. The juxtaposed lengths of the strips 107 forming each of the webs 105 are secured together remote from the openings 109 with resistance welds 110. The strips 107 have flanged ends 115 some of which are welded to the inside of thin-walled, U section, annular supports 116 of stainless steel and the remainder to the sides of the webs 120.

7 webs 120 are disposed radially from a central tubular boss 121 of the same depth as the webs 120 and extend to the inside of the supports 116, each web 120 having an end flange 123 which is welded to its respective support 116. The other ends of the webs 120 are welded to the boss 121. A central aperture is defined in the boss 121 by seven thin stainless steel strips 124 of the same depth as the boss 121, each of which has an outline of basically C shape and also has end flanges 125 which are welded to the inner wall of the boss 121. The juxtaposed portions of the strips 124 are joined together by resistance welds 126.

The carrier member 104 comprises an outer graphite sleeve 118 housing graphite sleeves 117 disposed in pairs, alternate pairs being end-spaced from one another by a support 103a which is of deeper section than a support 103 so as to accommodate the opposed ends of fuel rods 102 in adjacent lattices. (The depth of the support 103a is large enough to make the support inherently resistant to dishing stresses and hence it does not require reinforcing webs.) The sleeves 117 have cut-away parts 140 defining annular spaces 141 which reduce heat losses from coolant flowing along the interior of the carrier member 104.

The fuel element 101 is located in a vertical fuel channel 146 of a graphite-moderated reactor core structure 147 and supported by a tubular stool 148 disposed in the lower end of the channel. A small fraction of coolant ($CO_2$ gas) is fed down between the fuel element 101 and the wall of the channel 146 (as shown by the arrows 149) to join a main flow of coolant passing in counterflow along the interior of the carrier member 104 (as shown by arrows 150) to remove heat from the fuel rods 102 housed therein. The stool 148, which is of graphite, is penetrated by a circumferential ring of apertures 176 through which a by-pass stream of the said small fraction of coolant passes.

Each fuel rod 102 comprises a stack of sintered UO₂ fuel pellets 127 contained in a tubular sheath 128 of stainless steel, end-sealed by stainless steel end caps 129. The fue pellets 127 are spaced from the end caps 129 by heat-insulating plugs 130 of sintered alumina. Each stack of fuel pellets 127 is divided by alumina plugs 142 having circumferential grooves 143 and the sheaths 128 are keyed into the grooves 143 by external pressurisation during manufacture of the fuel rod. The fuel rods 102 are restrained against bowing by light grid structures 160 disposed between adjacent pairs of graphite sleeves 117 and in line with the alumina plugs 142. Each grid structure 160 is of similar form to a grid structure 103a but of much less depth. The grid 160 has locating apertures 161 defined by thin, interconnected strips 162 attached to an annular support 163. The apertures 161 have clearance with the fuel rods 102. If bowing occurs and the fuel rods 102 touch the strips 162, local overheat does not take place as the alumina plugs 142 are poor conductors of heat generated in the adjacent fuel pellets 127. Each sheath 128 has a series of circumferential ribs 131 along its length to increase heat transfer from the fuel rods 102 to coolant flowing along the fuel rods and to add strength to the sheath. The sheaths 128 have collars 144 which rest on the upper edges of the strips 107 of the grid support structures 103.

A hollow tie bar 132 of stainless steel interconnects a graphite end-support ring 151, the graphite sleeves 117, 118 and the grid structures 103, 103a, the lower end of the tie bar having a head 155 located in a recess 152 formed in a central boss 153 attached by webs 154 to the support ring 151. The head 155 is retained in the boss 153 by a screwed ring 156 and circlip 157. The tie bar 132 has a boss 133 which is a sliding fit in the central apertures defined in the boss 121 by the strips 124.

Slots 164 at the lower ends of the graphite sleeves 117 locate keys 165, 166 and 167 on the grid structures 103, 160 and 103a respectively to prevent relative rotation between the grid structures and the sleeves. Relative rotation between adjacent grid structures 103 and the graphite sleeve 118 is prevented by locking members 168 of U section which bridge the grid structures 103 and are located by slots 169a in a graphite ring 169 screwed into the sleeve 118 and by thin strips 170 of stainless steel bent to the shape of the locking members 168 and welded to the walls of the supports 116. Relative rotation between the lowermost grid structure 103 and the graphite sleeve 118 is prevented by a locking member 171 welded to the wall of the respective support 116 and located by a slot 172 in an internal flange 173 at the lower end of the sleeve 118.

One fuel rod 102 (see FIGURE 1A) of each lattice has a pair of closely spaced collars 174 formed on the external surface of its sheath 128. The collars 174 provide an anchoring point for a hot junction formed at the end of a thermocouple cable 175. Before assembly of the fuel cluster, the end of the cable 175 forming the hot junction is wound around the space between the collars 174 and the collars are then crimped to hold the cable end whilst the cable is secured to the fuel rod 102 by brazing. When the fuel cluster element 101 is in the reactor, the cable 175 extends upwardly through the fuel element to a remote temperature reading instrument at the reactor charge face.

The webs 105 are not of sufficient thickness to be inherently capable of resisting any tendency of the grid structures 103 to "dish" (that is becoming concave as viewed from the faces of the grid structures facing the fuel rods 102) but when reinforced by the thicker webs 120, this tendency is successfully resisted so as to prevent disturbance of the co-axial fit of a fuel rod 102 in a grid structure 103 which might otherwise give rise to undesirable stressing of the fuel rods. Dishing stresses set up in a grid structure 103 due to movement of the fuel rods 102 with temperature changes are transferred by the webs 120 to the relatively strong support 116.

The arrangement of the webs 105, 120 edge-wise to coolant flow through the carrier member 104 ensures that the flow of coolant through the fuel element 101 is not impeded unduly.

FIGURES 4 and 5 show the top end of a cluster fuel element 201 having a series of twenty-one spaced fuel rods 202, the upper ends of which are located in a grid support structure 203 located in a carrier member 204. The structure 203 is formed from 49 webs 205 and is reinforced by 7 (.040″) webs 220, providing an anti-dishing support 206.

The structure 203 is fabricated from thin (.010″) stainless steel strips 207 having transverse troughs 208 of arcuate form at intervals and assembled with the lengths of the strips 207 intermediate the troughs 208 juxtaposed in pairs to form the webs 205, with the troughs 208 coming together to define a number of spaced openings 209 in which the ends of the rods 202 are located as a sliding fit. The juxtaposed lengths of the strips 207 forming each of the webs 205 are secured together remote from the openings 209 with resistance welds 210.

In FIGURE 6 the strips 207 making up the structure 203 are shown fashioned into a number of components 211, 212, 213 and 214 of four differing outlines. The outline of the single component 211 is basically seven-sided, that of each of the seven components 213 basically triangular, the components 211, 212, 213 all having arc-like corners formed by the troughs 208. The fourteen components 214 each have an outline of basically C shape with two arc-like corners formed by the troughs 208, and also have flanged ends 215.

Referring again to FIGURES 4 and 5, the flanged ends 215 of the components 214 are welded to the inside of a thin-walled, U section, annular support 216 of stainless steel construction. The carrier member 204 comprises inner and outer graphite sleeves 217, 218 and the support 216 of the structure 203 is located in the carrier member 204 by the sleeve 217 and a screwed graphite retaining ring 219 (the sleeve 218 and the ring 219 have been omitted from FIGURE 5 so that details of the structure 203 and the anti-dishing support 206 are not obscured).

The webs 220 are .040″ in thickness and are equispaced around a central tubular boss 221 of the same depth as the webs 220 and positioned immediately above the structure 203. The webs 220 are welded both to the boss 221 and to the periphery of the structure 203, each web 220 having an angled end 222 provided with an end flange 223 which is welded to the support 216 of the structure 203. Each web 220 crosses over and makes edge contact with two of the thin webs 205 of the structure 203. A central aperture is defined in the boss 221 by seven thin stainless steel strips 224 of the same depth as the boss 221 and each of which has an outline of basically C shape and also has end flanges 225 which are welded to the boss 221. The juxtaposed portions of the strips 224 are joined together by resistance welds 226.

Each fuel rod 202 comprises a stack of sintered UO₂ fuel pellets 227 contained in a tubular sheath 228 of stainless steel, end-sealed by stainless steel end caps 229. The fuel pellets 227 are spaced from the end caps 229 by heat-insulating plugs 230 of sintered alumina. Each sheath 228 has a series of circumferential ribs 231 along its length (as shown on two of the fuel rods 202 in FIGURE 4) to add strength to the sheath and to increase heat transfer from the fuel rods 202 to a coolant medium flowing upwardly over the fuel rods.

At the bottom end of the cluster 201 the fuel rods 202 are located in a lower grid support structure similar to the structure 203. The sheaths 228 have collars which rest on the strips (corresponding to the strips 207) of the lower grid support structure, the weight of the fuel rods 202 thus being taken on the collars by the upper edges of the strips. The lower grid support structure has an anti-dishing support similar to the support 206 but provided on the underneath of the lower structure, that is to say at both the top and bottom ends of the cluster 201 the anti-dishing supports are provided on the faces of the grid support structures facing away from the fuel rods 202.

A tie bar 232 interconnects the carrier member 204 and the grid support structures and their associated anti-dishing supports, the bar 232 having a boss 233 which is a sliding fit in the central aperture defined in the boss 221 by the strips 224.

Dishing stresses set up in the structure 203 due to movements of the fuel rods 202 with temperature changes are transferred by the webs 220 to the relatively strong support 216 at the periphery of the structure 203. The anti-dishing support associated with the lower grid support structure functions in a similar manner.

As in the first embodiment, the arrangement of the webs 220 (and similarly the strips 207) edgewise-on to coolant flow through the cluster ensures that the flow is not unduly impeded.

The webs 220 may be joined (e.g. welded) to the webs 205 where they cross over and make edge contact with them.

We claim:

1. An end support structure for a cluster of fuel elements, said end support structure comprising a first group of relatively thin webs, said webs having trough portions, intermediate portions and end portions, said intermediate portions of adjacent webs being juxtaposed and secured together, said trough portions of a group of said webs forming spaced openings providing a means for locating ends of fuel elements by push fit, a second group of relatively thick webs, an outer support ring, said second group of relatively thick webs being secured to said outer support ring, the end portions of certain of said first group of relatively thin webs being secured to the second group of relatively thick webs, the end portions of the remainder of said first group of relatively thin webs being secured to the outer support ring, whereby a grid structure comprising the first group of webs is relatively thin, locates the fuel elements and is relatively weak in a direction parallel to the axes of the fuel elements, and the second group of webs and the outer support ring are relatively thick and reinforce the grid structure against stresses tending to dish the end support structure.

2. An end support structure according to claim 1 wherein the outer ends of said second group of webs are secured to the outer support ring and the inner ends of said second group of webs are secured to an inner ring.

3. An end support structure according to claim 1 wherein the second group of webs extend radially, with said grid structure forming end support for the fuel elements and being disposed between pairs of said second webs.

References Cited in the file of this patent

UNITED STATES PATENTS

| | | |
|---|---|---|
| 1,852,363 | Parent | Apr. 5, 1932 |
| 2,346,715 | Woodward et al. | Apr. 18, 1944 |
| 2,983,660 | Loeb et al. | May 9, 1961 |
| 3,104,218 | Speidel et al. | Sept. 17, 1963 |

FOREIGN PATENTS

| | | |
|---|---|---|
| 1,082,679 | Germany | June 2, 1960 |
| 1,087,285 | Germany | Aug. 18, 1960 |